US008676864B2

(12) United States Patent
Lulewicz

(10) Patent No.: US 8,676,864 B2
(45) Date of Patent: Mar. 18, 2014

(54) METHODS AND SYSTEMS FOR PROVIDING SCHEMA LAYOUT IN AN ON-DEMAND SERVICES ENVIRONMENT

(75) Inventor: Joshua Lulewicz, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 13/314,111

(22) Filed: Dec. 7, 2011

(65) Prior Publication Data

US 2013/0046789 A1 Feb. 21, 2013

Related U.S. Application Data

(60) Provisional application No. 61/525,578, filed on Aug. 19, 2011.

(51) Int. Cl.
*G07F 17/30* (2006.01)
(52) U.S. Cl.
USPC ............................ 707/805; 715/800; 715/762
(58) Field of Classification Search
USPC ............... 707/790, 803, 805, 999.1; 715/800, 715/762, 763
See application file for complete search history.

(56) References Cited

U.S. PATENT DOCUMENTS

| 5,353,401 | A | * | 10/1994 | Iizawa et al. .................. 715/763 |
| 5,495,567 | A | * | 2/1996 | Iizawa et al. .................. 715/762 |
| 5,715,450 | A | | 2/1998 | Ambrose et al. |
| 5,821,937 | A | | 10/1998 | Tonelli et al. |
| 5,831,610 | A | | 11/1998 | Tonelli et al. |
| 5,873,096 | A | | 2/1999 | Lim et al. |
| 5,963,953 | A | | 10/1999 | Cram et al. |
| 6,092,083 | A | | 7/2000 | Brodersen et al. |
| 6,169,534 | B1 | | 1/2001 | Raffel et al. |
| 6,178,425 | B1 | | 1/2001 | Brodersen et al. |
| 6,189,011 | B1 | | 2/2001 | Lim et al. |
| 6,216,135 | B1 | | 4/2001 | Brodersen et al. |

(Continued)

FOREIGN PATENT DOCUMENTS

EP          1367503 A1 * 12/2003   ............... G06F 17/30

OTHER PUBLICATIONS

Hartwick College Technology Services; MS Access Table Properties and Relationships; "http://www.hartwick.edu/Prebuilt/TechServ_Access_Tables Relationships.pdf"; 2005.*

(Continued)

*Primary Examiner* — Dennis Truong
(74) *Attorney, Agent, or Firm* — David Lewis; Jayanthi Simha

(57) ABSTRACT

Methods and systems are provided for automatically arranging graphical representations of objects on a canvas. Optionally, the automatic arrangement of the graphical representation of the object may be performed in an on demand, multi-tenant database as part of a tool for creating and displaying schema. A data object with more connections to other data objects may tend to be placed closer to other objects, whereas data objects with fewer connections may tend to be placed further apart. The algorithm for placement is based on computations of pseudo-forces between objects. The pseudo force on an object from all other objects is calculated in a given time step and when the force is less than a threshold value, the positions of the objects is updated based on the forces. When the computed displacements are less than a threshold, the objects are in equilibrium.

17 Claims, 11 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,516,191 B2 | 4/2009 | Brouk et al. |
| 7,529,728 B2 | 5/2009 | Weissman et al. |
| 7,590,685 B2 | 9/2009 | Palmeri et al. |
| 7,689,711 B2 | 3/2010 | Brouk et al. |
| 7,712,026 B2 * | 5/2010 | Kobashi et al. ............... 715/243 |
| 7,725,605 B2 | 5/2010 | Palmeri et al. |
| 7,788,399 B2 | 8/2010 | Brouk et al. |
| 7,949,684 B2 | 5/2011 | Brooks et al. |
| 8,019,786 B2 * | 9/2011 | Nevin, III ..................... 707/797 |
| 8,095,531 B2 | 1/2012 | Weissman et al. |
| 8,131,713 B2 | 3/2012 | Weissman |
| 8,140,572 B1 | 3/2012 | Ballard et al. |
| 8,150,833 B1 | 4/2012 | Scotton et al. |
| 8,171,418 B2 | 5/2012 | Law |
| 8,229,922 B2 | 7/2012 | Weissman et al. |
| 8,230,062 B2 | 7/2012 | Newton |
| 8,244,658 B2 | 8/2012 | Weissman et al. |
| 8,244,759 B2 | 8/2012 | Brooks et al. |
| 8,255,566 B2 | 8/2012 | Brouk et al. |
| 8,275,763 B2 | 9/2012 | Weissman et al. |
| 8,280,874 B2 | 10/2012 | Weissman et al. |
| 8,280,875 B2 | 10/2012 | Weissman et al. |
| 8,321,405 B2 | 11/2012 | Weissman et al. |
| 8,332,387 B2 | 12/2012 | Weissman et al. |
| 8,335,781 B2 | 12/2012 | Weissman et al. |
| 8,402,045 B2 | 3/2013 | Scotton et al. |
| 8,412,820 B2 | 4/2013 | Newton |
| 8,423,535 B2 | 4/2013 | Weissman et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0130797 A1 * | 7/2003 | Skolnick et al. ................ 702/19 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0086238 A1 * | 4/2005 | Nevin, III .................... 707/100 |
| 2005/0091098 A1 | 4/2005 | Brodersen et al. |
| 2006/0064647 A1 * | 3/2006 | Tapuska et al. ............... 715/800 |
| 2007/0088741 A1 | 4/2007 | Brooks et al. |
| 2007/0124276 A1 | 5/2007 | Weissman et al. |
| 2008/0033897 A1 * | 2/2008 | Lloyd ............................. 706/19 |
| 2008/0082540 A1 | 4/2008 | Weissman et al. |
| 2008/0183687 A1 | 7/2008 | Law |
| 2009/0228830 A1 * | 9/2009 | Herz et al. .................... 715/808 |
| 2009/0276395 A1 | 11/2009 | Weissman et al. |
| 2009/0276405 A1 | 11/2009 | Weissman et al. |
| 2010/0079461 A1 * | 4/2010 | Breeds et al. ................. 345/440 |
| 2010/0191719 A1 | 7/2010 | Weissman et al. |
| 2010/0211619 A1 | 8/2010 | Weissman et al. |
| 2010/0217758 A1 | 8/2010 | Weissman et al. |
| 2010/0223254 A1 | 9/2010 | Weissman et al. |
| 2010/0223255 A1 | 9/2010 | Weissman et al. |
| 2010/0223284 A1 | 9/2010 | Brooks et al. |
| 2010/0235445 A1 | 9/2010 | Palmeri et al. |
| 2010/0235837 A1 | 9/2010 | Weissman et al. |
| 2010/0274779 A1 | 10/2010 | Weissman et al. |
| 2010/0281014 A1 | 11/2010 | Weissman et al. |
| 2010/0281015 A1 | 11/2010 | Weissman et al. |
| 2010/0281016 A1 | 11/2010 | Weissman et al. |
| 2010/0299663 A1 | 11/2010 | Weissman et al. |
| 2010/0306536 A1 | 12/2010 | Brouk et al. |
| 2011/0082854 A1 | 4/2011 | Eidson et al. |
| 2011/0083122 A1 | 4/2011 | Chen et al. |
| 2011/0106808 A1 | 5/2011 | Hersans et al. |
| 2011/0196883 A1 | 8/2011 | Brooks et al. |
| 2011/0202508 A1 | 8/2011 | Brooks et al. |
| 2011/0202911 A1 | 8/2011 | Brooks et al. |
| 2011/0231501 A1 | 9/2011 | Swamidass |
| 2011/0238705 A1 | 9/2011 | Baker et al. |
| 2011/0238707 A1 | 9/2011 | Wong et al. |

(56) References Cited

U.S. PATENT DOCUMENTS

| | | |
|---|---|---|
| 2011/0246419 A1 | 10/2011 | Yancey et al. |
| 2011/0246449 A1 | 10/2011 | Collins et al. |
| 2011/0246465 A1 | 10/2011 | Koister et al. |
| 2011/0246538 A1* | 10/2011 | Boley et al. .................. 707/805 |
| 2011/0247017 A1 | 10/2011 | Hopkins et al. |
| 2011/0258225 A1 | 10/2011 | Taylor et al. |
| 2011/0261049 A1* | 10/2011 | Cardno et al. ................ 345/419 |
| 2011/0276946 A1 | 11/2011 | Pletter |
| 2011/0289508 A1 | 11/2011 | Fell et al. |
| 2012/0023107 A1 | 1/2012 | Nachnani et al. |
| 2012/0054241 A1 | 3/2012 | Brooks et al. |
| 2012/0054328 A1 | 3/2012 | Brooks et al. |
| 2012/0059807 A1 | 3/2012 | Brooks |
| 2012/0059853 A1 | 3/2012 | Jagota |
| 2012/0059862 A1 | 3/2012 | Brooks et al. |
| 2012/0079004 A1 | 3/2012 | Herman |
| 2012/0084266 A1 | 4/2012 | Brooks et al. |
| 2012/0086544 A1 | 4/2012 | Kemp |
| 2012/0089550 A1 | 4/2012 | Arora et al. |
| 2012/0089638 A1 | 4/2012 | Jagota et al. |
| 2012/0089647 A1 | 4/2012 | Jagota et al. |
| 2012/0110020 A1 | 5/2012 | Weissman et al. |
| 2012/0131068 A1 | 5/2012 | Scotton et al. |
| 2012/0143870 A1 | 6/2012 | Ballard et al. |
| 2012/0144313 A1 | 6/2012 | Park et al. |
| 2012/0158834 A1 | 6/2012 | Brouk et al. |
| 2012/0158835 A1 | 6/2012 | Brouk et al. |
| 2012/0179762 A1 | 7/2012 | Arora et al. |
| 2012/0188252 A1 | 7/2012 | Law |
| 2012/0209586 A1 | 8/2012 | Mieritz et al. |
| 2012/0233191 A1 | 9/2012 | Ramanujam |
| 2012/0239629 A1 | 9/2012 | Brooks et al. |
| 2012/0246120 A1 | 9/2012 | Brooks et al. |
| 2012/0253885 A1 | 10/2012 | Newton |
| 2012/0317121 A1 | 12/2012 | Fuchs et al. |
| 2012/0317146 A1 | 12/2012 | Brooks et al. |
| 2012/0317149 A1 | 12/2012 | Jagota et al. |
| 2012/0324125 A1 | 12/2012 | Brouk et al. |
| 2012/0330710 A1 | 12/2012 | Hauser et al. |
| 2013/0007049 A1 | 1/2013 | Ziemann |
| 2013/0013773 A1 | 1/2013 | Weissman et al. |
| 2013/0018879 A1 | 1/2013 | McConnell et al. |
| 2013/0018982 A1 | 1/2013 | McConnell et al. |
| 2013/0019235 A1 | 1/2013 | Tamm |
| 2013/0021370 A1 | 1/2013 | Dunn et al. |
| 2013/0024479 A1 | 1/2013 | Gong et al. |
| 2013/0024511 A1 | 1/2013 | Dunn et al. |
| 2013/0024788 A1 | 1/2013 | Olsen et al. |
| 2013/0024795 A1 | 1/2013 | Robotham et al. |
| 2013/0031496 A1 | 1/2013 | Mathrubootham et al. |
| 2013/0036239 A1 | 2/2013 | Spencer |
| 2013/0041912 A1 | 2/2013 | Arora et al. |
| 2013/0046752 A1 | 2/2013 | Weissman et al. |
| 2013/0046789 A1 | 2/2013 | Lulew |
| 2013/0046799 A1 | 2/2013 | Hale et al. |
| 2013/0054648 A1 | 2/2013 | Mehta et al. |
| 2013/0054792 A1 | 2/2013 | Sharaf |
| 2013/0055147 A1 | 2/2013 | Vasudev et al. |
| 2013/0060792 A1 | 3/2013 | Weissman et al. |
| 2013/0061156 A1 | 3/2013 | Olsen et al. |
| 2013/0085745 A1 | 4/2013 | Koister et al. |
| 2013/0086670 A1 | 4/2013 | Vangpat et al. |
| 2013/0093759 A1 | 4/2013 | Bailey |
| 2013/0097500 A1 | 4/2013 | Rajagopal |
| 2013/0097713 A1 | 4/2013 | White |
| 2013/0117191 A1 | 5/2013 | Jagota et al. |
| 2013/0117287 A1 | 5/2013 | Jagota et al. |

OTHER PUBLICATIONS

PC Network Advisor; Understanding MS Access Security; "http://www.techsupportalert.com/pdf/t1526.pdf"; 2000.*

Using the Navigotor Panel in Adobe Photoshop Lightroom; "http://thelightroomlab.com/2008/12/using-the-navigator-panel-in-lightroom/"; Scott Rouse; Dec. 15, 2008.*

* cited by examiner

METHODS AND SYSTEMS FOR PROVIDING SCHEMA LAYOUT IN AN ON-DEMAND SERVICES ENVIRONMENT

CLAIM OF PRIORITY

This application claims the benefit of U.S. Provisional Patent Application No. 61/525,578 entitled, METHODS AND SYSTEMS FOR DESIGNING AND BUILDING A SCHEMA IN AN ON-DEMAND SERVICES ENVIRONMENT By Shannon Hale, filed Aug. 19, 2011, the entire contents of which are incorporated herein by reference.

COPYRIGHT NOTICE

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/313,918, entitled METHODS AND SYSTEMS FOR DESIGNING AND BUILDING A SCHEMA IN AN ON-DEMAND SERVICES ENVIRONMENT, By Shannon Patricia Hale, filed Dec. 7, 2011; and U.S. patent application Ser. No. 13/314,111 entitled METHODS AND SYSTEMS FOR PROVIDING SCHEMA LAYOUT IN AN ON-DEMAND SERVICES ENVIRONMENT By Josh Lulewicz, filed Dec. 7, 2011.

U.S. Provisional Patent Application No. 61/525,578 entitled, METHODS AND SYSTEMS FOR DESIGNING AND BUILDING A SCHEMA IN AN ON-DEMAND SERVICES ENVIRONMENT By Shannon Hale, filed Aug. 19, 2011.

FIELD OF THE INVENTION

One or more implementations relate generally to visualizing schema.

BACKGROUND

The subject matter discussed in the background section may not be assumed to be prior art merely as a result of its mention in the background section. Similarly, a problem mentioned in the background section or associated with the subject matter of the background section may not be assumed to have been previously recognized in the prior art. The subject matter in the background section merely represents different approaches, which in-and-of-themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid, secure, and efficient retrieval of accurate information and subsequent delivery of this information to the user system in a manner that may be easy to understand has been and continues to be a goal of administrators of database systems.

Database systems may reside on a central system accessible by a network. Cloud computing services may provide database/database-like functionality. In general, the data and/or data elements of a database have a pre-specified or inherent structure, and relationships may exist between various pieces of data and/or data elements of a database system. For example, database modeling may be used to design, implement and revise the structure of a database. In general, a database may be structured in a way that places constraints on the manner in which the contents of the database may be used or arranged. The structure of the database may be described in a formal language, and the description may be available (e.g., accessible, viewable or usable in some way) on the database system.

Accordingly, it may be desirable to provide techniques for visually presenting the relationship between data elements within the database to the users of the database system, which may be a multi-tenant database system.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for laying out graphical representations of data objects in a schema builder. Note that although various implementations are described in the context of a multi-tenant database network system (or multi-tenant database system), these and other implementations may also be utilized in other environments as well, for example, on-demand service environments, LAN systems, WAN systems, database systems, etc.

As used herein, the term multi-tenant database system refers to those systems in which various elements of hardware and software of the database system may be shared by one or more tenants. For example, a given application server may simultaneously process requests for a great number of tenants, and a given database table may store rows for a potentially much greater number of tenants. As used herein, the term query plan refers to a set of steps used to access information in a database system. In this specification, although a single login for a workbench and database server may be described, the workbench is just one example of a web-based tool and the database server is just one example of a server.

Below, mechanisms and methods for providing a layout of a schema in a schema builder, optionally in a multi-tenant database network system, are described with reference to example embodiments.

Figure 1:
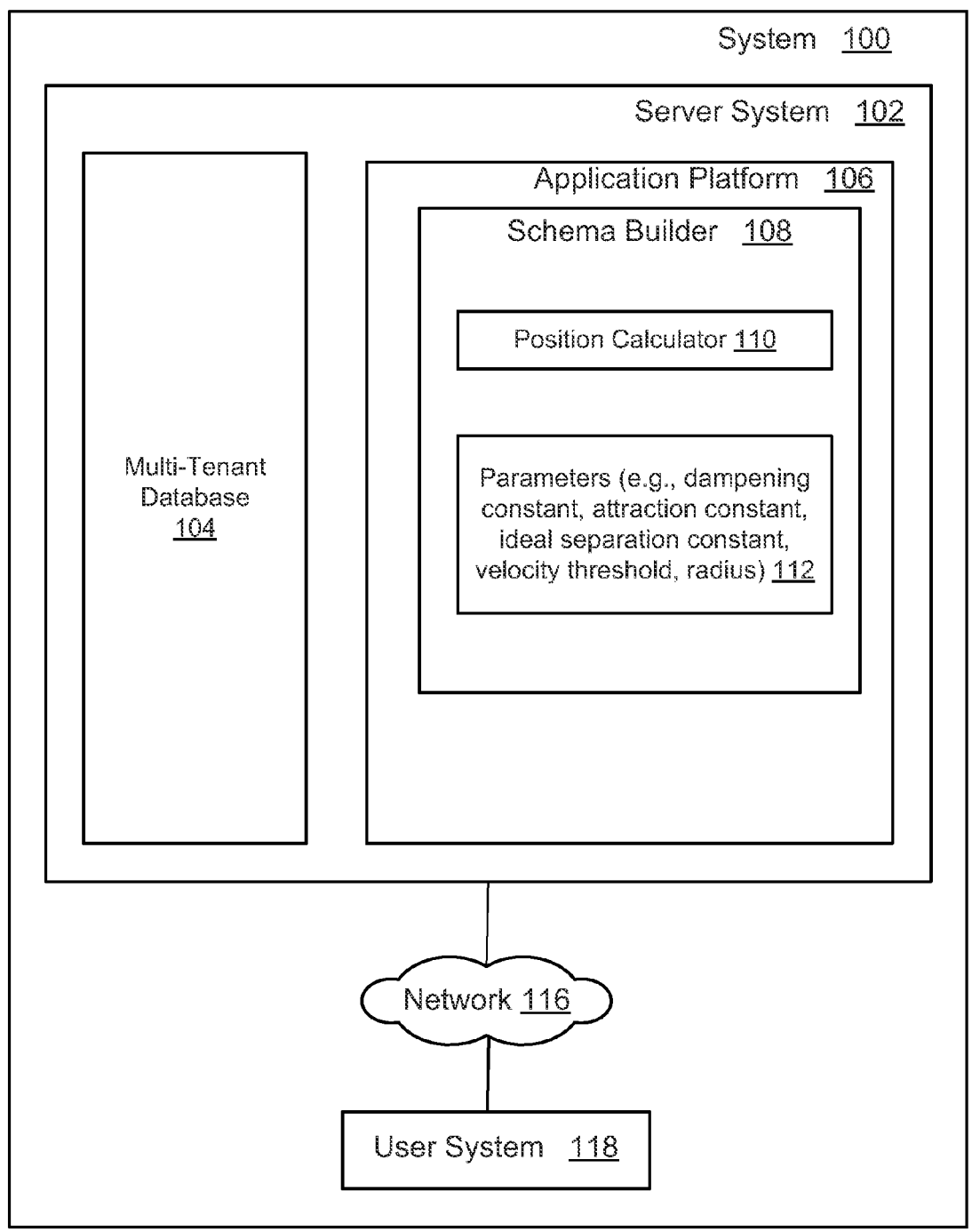
FIG. 1 shows a block diagram of an embodiment of a system of schema builder layout tool.

FIG. 1 shows an embodiment of system 100, a system with a schema builder with tools for automatically laying out the schema, which may be used with an on-demand multi-tenant database system. In an embodiment, system 100 may include a host server system 102, multi-tenant database 104, application platform 106, schema builder 108, position calculator 110, parameters 112, network 116, and user system 118 among others. In other embodiments, system 100 may not have all of the elements or features listed and/or may have other elements or features instead of or in addition to those listed.

System 100 may be a system for providing tools for establishing the layout of database objects via the schema builder. Database objects may be elements of data within a database system, or pieces of information that correspond, in some manner, to data in the database system. In this specification the terms nodes, graphical representation of data objects, data object, and object maybe used interchangeably and the terms object and table may be used interchangeably to obtain different embodiments. In one example, the tool may organize the objects based on the relationship of an object with other objects. Objects that are related, or have multiple relationships, may be placed close to one another, while objects with fewer relationships, or that are not related to other objects, may be placed apart. In an embodiment, objects with more relationships will tend to be located more centrally on the canvas than objects with fewer relationships. Placing related objects closer to one another and placing objects with more relationships in more central locations minimizes crossover of lines in a relationship diagram thereby improving the readability of the diagram, and the efficiency of user interaction with the objects (e.g., viewing, defining, or establishing the logical placement of the objects).

Server system 102 may be a system for serving clients of a multitenant database. Server system 102 may include multiple servers and/or multiple machines on which the server applications run. Server system 102 may be part of system 100. Server system 102 may include multi-tenant database for storing the tenant data, a database, and an application platform. Server system 102 may run machine instructions, and may include a memory storing machine instructions for a variety of applications. Server system 102 may receive requests from tenant machines (either directly from one of the tenant machines for via a web-based tool), compute a response (e.g., by retrieving data or running an application), and returns the results to the tenant's machine. Server system 102 may be discussed further in conjunction with FIG. 8, below.

Multi-tenant database 104 may be a database system with multiple tenants that each has a degree of access to at least a portion of the database system that may or may not be the same as the degree of access as other tenants. Each tenant may be an individual or an organization, and each tenant may have representatives, members, employees, customers and/or other entities associated with the tenant, which in turn may also have different degrees of access to the tenant's portion of the database as a result of the tenant's tenancy of the multi-tenant database. The degree of access granted to those associated with the tenant and/or which entities (e.g., representatives, members, employees, customers and/or other entities) that are associated with the tenant may be determined by the tenant. The database system be a relational database and may include multiple databases, and each database may be partitioned and/or otherwise shared amongst the multiple tenants. Multi-tenant database 104 may have any number of tenants and any number of user systems and may access a portion of the database. Multitenant database 104 may be provided on-demand in that the multi-tenant database and may be provided to the tenant as a service so that the tenant does not need to worry about the details of maintaining the database system. In an embodiment the multitenant database 104 may be a relational database.

In an embodiment, application platform 106 is a platform for hosting a schema builder with auto-layout tools. Application platform 106 facilitates the receipt, by the schema builder, of input from a user system via a network, and sends queries to multi-tenant database 104. In an embodiment, application platform 100 may have schema builder 108.

Schema builder 108 may be a tool for generating the schema of at least a portion of a database associated with a tenant in the multi-tenant database 104. Schema of a database may be the description of the structure of a database including the organization of data objects, the relationships of the data objects and the constraints of the data objects. Schema builder 108 may be a tool to describe and visualize the data objects, and/or the fields and the relationships in an interactive Relationship Diagram (e.g., an Entity Relationship Diagram). Schema builder 108 has a canvas for displaying the visual description of data and a side bar with options for selecting various objects, defining the objects and viewing a visual depiction of the relationships between objects (e.g., an ERD). The sidebar lists options for controlling which objects are displayed, along with a check box to select for selecting display options, for adjusting the manner the objects are displayed on the canvas. Schema Builder 108 may also depict relationships among data objects that are displayed on the canvas, as mentioned above. Lookup relationships may be visually represented by lines connecting the related objects. In an embodiment, a database element (e.g., a field or an object representing a field) of one table may look up and/or make use of data from another table. The relationship between the table that receives and/or makes use of the data that is looked up, and the table that provides the information that was looked up may be referred to as a "lookup relationship." In an embodiment, holding a mouse over a look-up relationship may display a pop-up window with information about the relationship. Master-detail relationships may be visually represented by lines connecting the objects relate to one another in a master-detail relationship. The master-detail relationship is a special type of parent-child relationship between data objects where one data object is a master and the other data objects are children. In an embodiment, the relationship field is required for all detail records. In an embodiment, the relationship field cannot be changed after creating and saving the relationship field. The ownership and sharing of detail record may be determined by the master data object. In an embodiment, when a user deletes the master record, all detail records are deleted. In an embodiment, a user can create rollup summary fields on the master record to summarize the detail records (a rollup is any aggregation of data, such as a total, median, average, or standard deviation). In an embodiment, the relationship field allows users to click on a lookup icon to select a value from a popup list, and the master object is the source of the values in the list.

The connecting lines representing the master-detail relationships are of a different type (e.g., color, thickness, contiguity) than the lines representing the lookup relationships. Schema builder 108 displays graphical representations of all objects, fields of objects, and relationships between objects. The master-detail relationships and lookup relationships are represented with lines that may have different colors that help identify which objects are being represented by the line. The schema builder may provide the ability to switch views between a view showing the labels of objects and fields and a view showing the API names of the same objects and fields.

Schema builder may provide an option that visually reorganizes the data objects on the canvas. Reorganizing the data objects is based on the number of relationships with other objects. Objects with fewer relationships tend to be placed further from one another, whereas objects with larger numbers of relationships tend to be placed closer to one another on the canvas. To determine the positions of the objects, the simulated forces are computed, which act upon the objects. The simulated forces may include a repulsive force among objects (e.g., between all objects or all objects within a certain distance of one another). Related objects may have attractive forces. The strength of the attractive force may be proportional to the number of relationships between the objects. Objects may be pushed and/or pulled each time the forces are calculated and the objects attain new positions, until equilibrium is reached for all objects.

Position calculator 110 calculates the position of objects. In this specification the terms "data object", "object", and "node" maybe used interchangeably. In an embodiment, in each iteration, the velocity of each graphical representation of s data object is computed for a given pseudo-time. The pseudo time is advanced by a given amount (e.g., the same amount) each iteration. In this specification, the term "time step" is used to refer to the pseudo time step of the simulation, which may not correspond to the time in the real world. The forces among the objects change after each iteration as the objects move with respect to one another, after a given time step. The velocity of each object is calculated for every time step. The velocity of an object is the sum of the repulsion forces of all objects on the current object within a specified radius of the current object, which may be multiplied by the dampening constant. If the sum of the absolute values of the x and y-components of velocity for a given graphical representation of a data object is greater than the threshold value (which may be a constant) then the graphical representation of the object is in motion, and the position of the graphical representation of the object is computed by adding the change in position, which may be the velocity times the change in time, for the time step to the current position. In this specification, the sum of the absolute value of the x-component of velocity and the absolute value of the y-component of velocity may be referred to as the "energy." In an embodiment, the change in time for each iteration has a value of 1, so the change in position is equal to the velocity. If the sum of the absolute value of x-component of velocity and the y-component of velocity of the graphical representation of the object is less than the threshold, then the graphical representation of the object is considered to be in equilibrium, and the position is not changed. In an embodiment, the velocity may be computed from the equation.

$$\text{velocity} = \sum \text{repulsion force of all objects in a specified radius} +$$
$$\left(\sum \text{number of objects connected} * \text{dampening constant}\right)$$

$$v_n = 100 \sum_{\substack{m=1, for\, m \neq n, for\, object\, not\, related\, to\, object\, n, \\ and\, only\, for\, objects\, radius\, R\, of\, the\, point\, x_m, y_m}}^{M} \frac{(x_m - x_n)\hat{x} + (y_m - y_n)\hat{y}}{(x_m - x_n)^2 + (y_m - y_n)^2} -$$

$$100(.96) \sum_{\substack{m=1, for\, m \neq n, for\, object\, that\, are\, related \\ to\, object\, n, and\, only\, for\, objects \\ radius\, R\, of\, the\, point\, x_m, y_m}}^{M} \frac{(x_m - x_n)\hat{x} + (y_m - y_n)\hat{y}}{(x_m - x_n)^2 + (y_m - y_n)^2}.$$

The sum of repulsion calculations of all other objects (within a specified radius)+the sum of all the objects connected to the object*dampening constant The repulsive force between two graphical representations of data objects at a given time is:

$$\frac{(\text{Position of node1} - \text{Position of node2})}{(\text{Distance between nodes})^2}$$

The repulsive force may also be expressed as:

$$\text{Force} = K \frac{(x1 - x2)\hat{i} + (y1 - y2)\hat{j}}{(x1 - x2)^2 + (y1 - y2)^2}$$

The attractive force between two graphical representations of data objects at a given time is $$\frac{(\text{Position of } node_m - \text{Position of } node_n) * (\text{attraction constant}) * (\text{dampening constant})}{\sum_{0}^{m} (\text{Distance between nodes})^2}$$

where node 1 represents a first graphical representation of a data object and node 2 represents a second graphical representation of a data object.

Positions calculator 110 may also determine whether a current set of positions calculated represents an equilibrium state every time step after position calculator 110 calculates a new position of a graphical representation of a data object and/or after position calculator calculates a new set of positions of the graphical representation of the data objects on the canvas. When the velocity of a given graphical representation of a data object is less than a threshold velocity, graphical representation of the data object is said to be in equilibrium and the position of the graphical representation of the data object is not advanced. The process of calculating the position may be performed iteratively, by repeatedly computing the velocity to determine the new position of the graphical representation of the data object and checking for equilibrium, until all the graphical representations of the data objects are in equilibrium.

Parameters 112 stores various parameters such as dampening constant, attraction constant, ideal separation, radius, and threshold. Dampening constant is a multiplying factor to dampen the repulsive force so that the graphical representations of the data objects reach equilibrium. Under at least certain circumstances, the graphical representations of the data objects may move in opposite directions indefinitely without the damping factor. In an example, the damping constant may be 0.96. Ideal separation is used to calculate the attractive force. In an example, the ideal separation may be 100. The repulsion constant is a multiplying factor that is chosen to ensure that the graphical representations of the data objects do not overlap too significantly (e.g., to ensure that the data object do not lie one on top of the other). In an embodiment, $$\text{the attraction constant} = \frac{1.0}{\text{ideal } separation^3}$$

For every time step, the position of the graphical representation of the data object is calculated based on the repulsive and attractive forces within a radius, for example, the radius may be 200 pixels. The velocity of the graphical representation of the data object is calculated based on the repulsive and attractive forces for every time step. If the velocity is greater than the threshold, the graphical representation of the data object is assumed to be in equilibrium. In an example, the threshold may be 0.01.

Network 116 (which is further discussed in conjunction with FIG. 8) may be any network or combination of networks of devices that communicate with one another, such as the Internet, another wide area network, and/or one or more phone networks. Server system 102 may interact with the user systems via network 116 using a network interface (which may be also further discussed in conjunction with FIG. 8).

User system 118 may include a plurality of user systems that connect to server system 102, via network 116. User system 118 may be a device having at least one or more processors, a memory system, an input/output system, and a network interface, for example. User system 118 may send a request for the server system to automatically arrange the graphical representation of the data objects using the auto-layout option.

Server-Side Method

Figure 2:
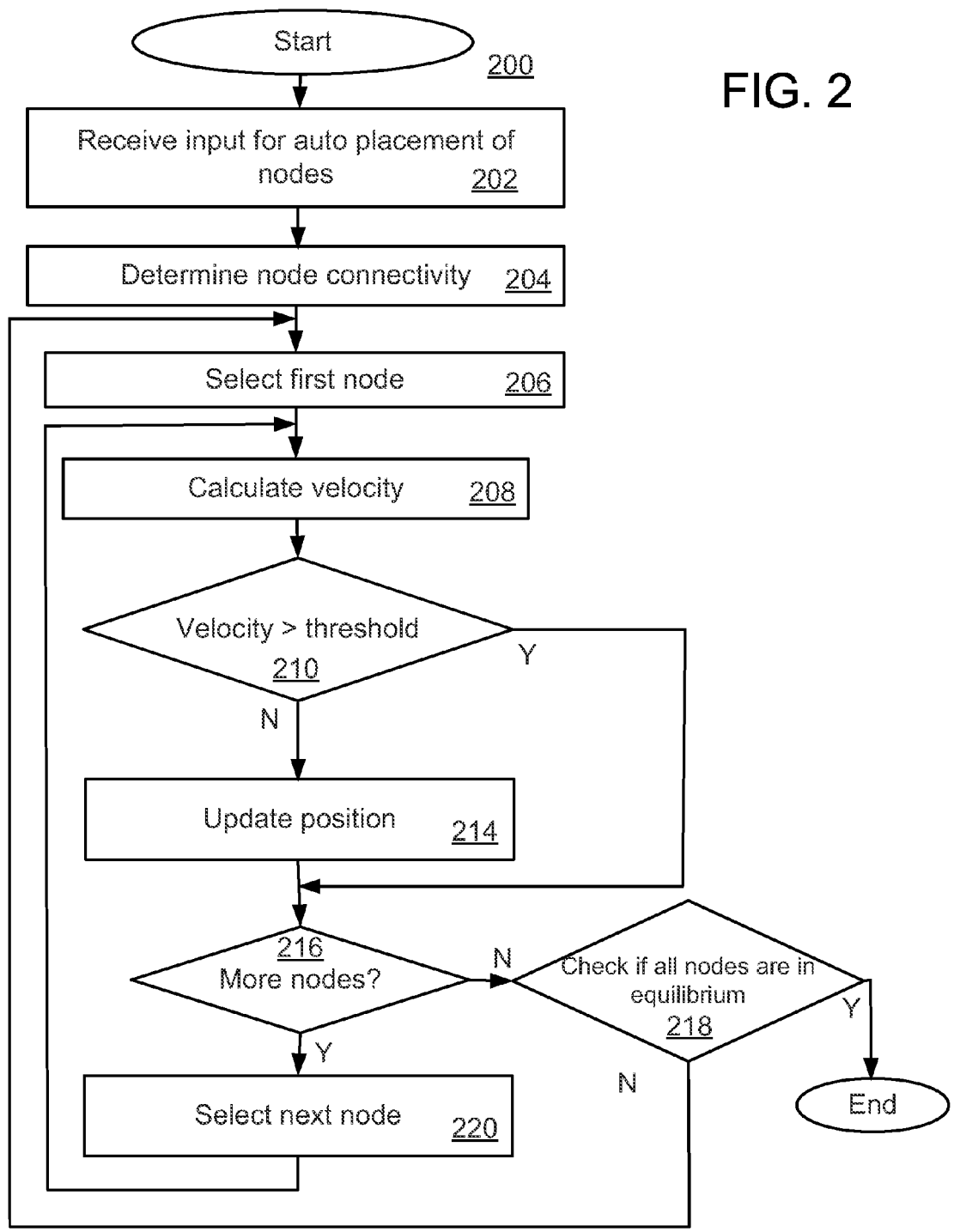
FIG. 2 shows a flow diagram of an embodiment of a server-side method of laying out schema.

FIG. 2 shows a flowchart of an embodiment of a server-side method 200 for auto-layout of the graphical representations of the data objects in a schema builder. In step 202, server system 102 may receive and/or retrieve inputs for auto-placement of the graphical representations of the data objects in schema builder 108. The inputs may be the data objects and the relationships between data objects. In an embodiment, the input may be to place the data objects. In another embodiment, the input may be the change in data objects and/or the change in relationship among the data objects. In other words, server system 102 may receive a request to open an existing schema, modify an existing schema, or create a new schema. Optionally, the user interface may include an interactive element (e.g., a button or a pull down menu), which when activated (e.g., by clicking on a button or selecting an option from a drop down menu), invokes a process that arranges the graphical representation of the data objects of the schema on the canvas. In step 204 method 200 checks which data objects are related to one another. In an embodiment, there may be a line connecting the graphical representations of related the data objects. The number of connections to graphical representations of data objects that are displayed in the schema may depend on the current selected view, the selection of the graphical representations of the data objects in a particular view, and/or the selection of which fields, labels, and/or names to display. For example, in one embodiment, the user may be able to choose whether the selected view includes all the graphical representations of the data objects, and the user may be able to select at least the following types of graphical representations of the data objects for viewing in the current view, standard data objects, custom data objects, or system data objects. Optionally step 204 may be part of step 202. In step 206, a graphical representation of a data object is selected for velocity calculation, and optionally, all graphical representations of a data objects connected to the selected graphical representation of a data object are determined. In step 208, the velocity of the selected graphical representation of a data object is calculated based on the sum of forces from all of the graphical representations of data objects in the current view that are related to the current, selected graphical representation of a data object. In an embodiment, the velocity is computed as the sum of all of the forces from all of the graphical representations of the data objects in the selected view to which the current graphical representation of a data object is related. In step 210 a determination is made of whether the sum of the absolute value of the x-component of velocity and the absolute value of the y-component of is greater than the threshold. If the velocity is greater than (or alternatively if the velocity is greater than or equal to) the threshold, method 200 proceeds to step 216. In an embodiment, if the velocity is less than or equal to (or alternatively if the velocity is greater than) the threshold, method 200 proceeds to step 214. In step 214, the position of the selected graphical representation of a data object is computed and updated. For example, in an embodiment, each component of the position is changed by the magnitude of the corresponding component of the velocity amount calculated in step 208 (optionally velocity may be multiplied by a proportionality constant, such as a time step to obtain the change in distance). In step 216, method 200 checks if there are more graphical representations of data objects for performing the velocity calculation on in current iteration. If there are no more graphical representations of data objects for which a position needs to be updated in the current iteration, method 200 proceeds to step 218. In step 218, method 200 checks if all graphical representations of data objects have reached equilibrium. If all graphical representations of data objects have not reached equilibrium, then method 200 proceeds to step 206 to select the next graphical representation of a data object, and starts the next iteration.

Returning to step 216, if there are no more graphical representations of data objects for which position needs to be updated in the current iteration, method 200 proceeds to step 220. In step 220, a graphical representation of a data object is selected for the velocity calculation. For every iteration (which may correspond to a time step), steps 204, 206, 208, 210, 214, and 216 are repeated for each graphical representation of a data objects. In an embodiment, each of the steps of method 200 may be a distinct step. In other embodiments, method 200 may not have all of the above steps and/or may have other steps in addition to or instead of those listed above. The steps of method 200 may be performed in another order.

Subsets of the steps listed above as part of method 200 may be used to form their own method. In an embodiment, there could be multiple instances of method 200.

The terminology regarding forces discussed in method 200 may be analogous to a force in general and may not be a specific physical force.

Client-Side Method

Figure 3:
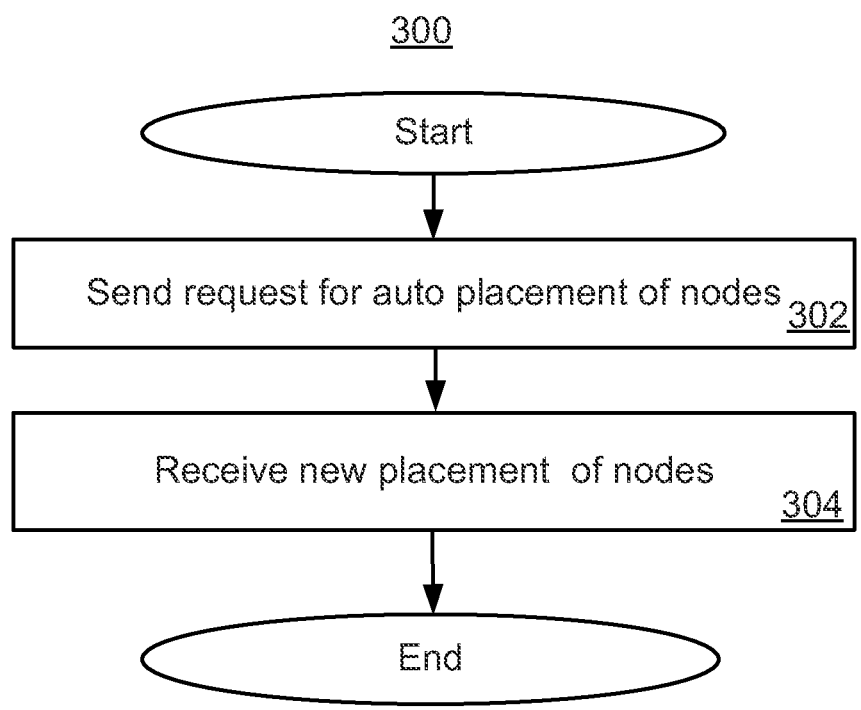
FIG. 3 shows a flowchart of an embodiment of a client-side method of laying out schema.

FIG. 3 shows a flowchart of an embodiment of a client-side method 200 for auto-layout of graphical representations of data objects in a schema builder. In step 302, user system 118 may send a request to server system 102 for auto-layout of graphical representations of data objects in schema builder 108. Step 302 may involve activating a button for requesting an automatic arrangement of a graphical representation of data objects on a canvas. Alternatively, step 302 may be initiated automatically in response to making a change to the graphical representation of the schema and/or a in response to making a change to the graphical representation of the schema that is expected to affect the layout of the graphical representations of data objects (such as an addition or removal of a relationship and/or graphical representation of a data object from the graphical representation of the schema. In step 304, user system 118 receives an updated view of the placement of graphical representations of data objects from server system 102.

In an embodiment, each of the steps of method 300 may be a distinct step. In other embodiments, method 300 may not have all of the above steps and/or may have other steps in addition to or instead of those listed above. The steps of method 300 may be performed in another order. Subsets of the steps listed above as part of method 300 may be used to form their own method. In an embodiment, there could be multiple instances of method 300.

Screenshots

Figure 4:
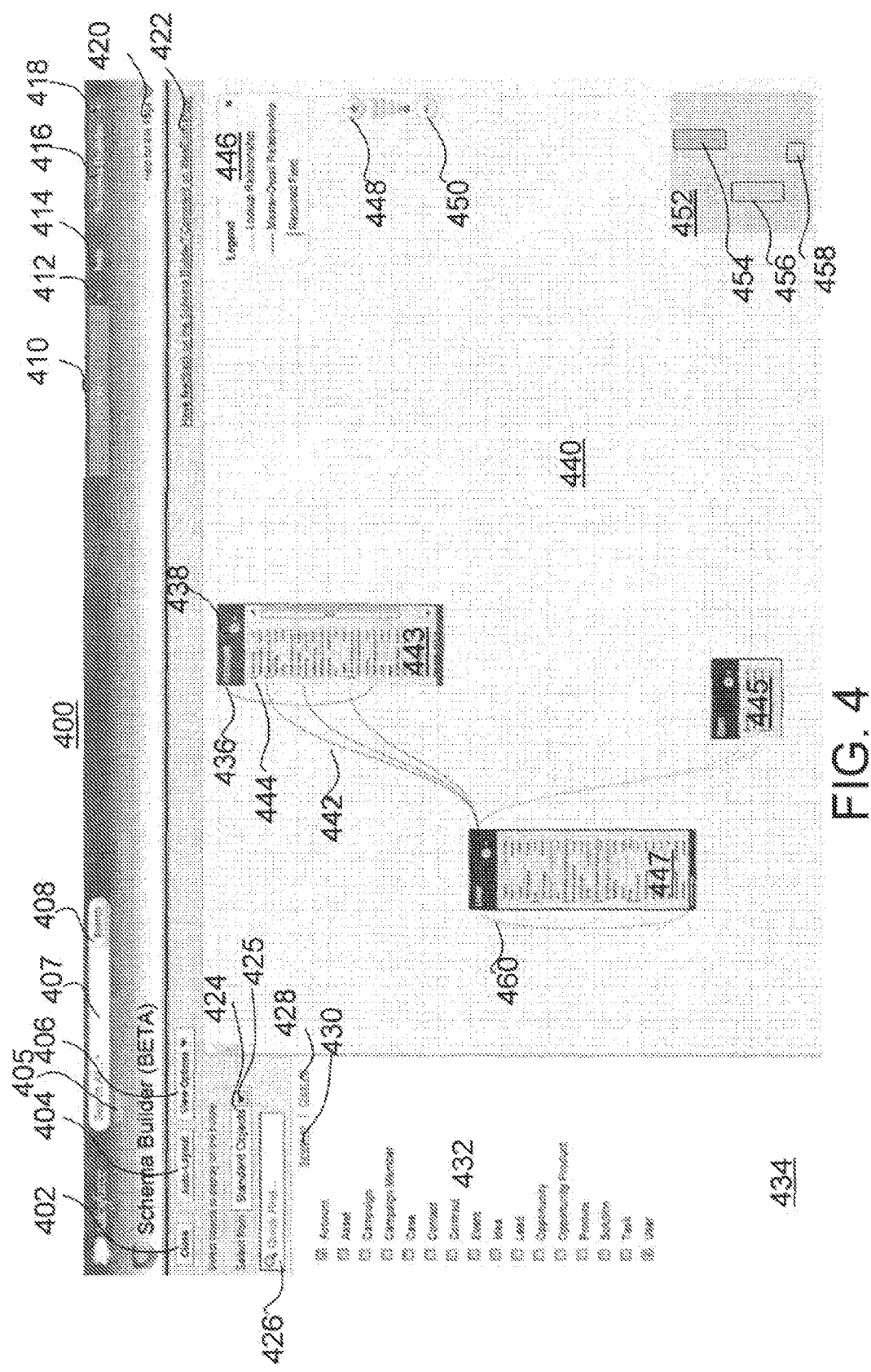
FIG. 4 shows a screenshot of an embodiment of an example schema in the schema builder prior to applying the auto-layout.

FIG. 4 shows a screenshot of an embodiment schema builder example 400, an example schema in the schema builder. Schema builder example 400 may include close button 402, auto-layout button 404, options 405, view options 406, search input box 407, search button 408, username 410, user menu 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, account object 443, required fields 444, item object 445, legend 446, user object 447 zoom in button 448, zoom out button 450, map 452, account object on map 454, user object on map 456, item object on map 458 and master-detail relationship 460. In other embodiments, scheme builder 400 may not have all of the elements listed and/or may have other elements instead of or in addition to those listed.

Schema builder example 400 shows a screen with a canvas displaying the data objects and a side bar with menu. Schema builder example 400 may be a screenshot before applying the auto-layout. Close button 402 when selected closes the schema builder screen. Auto-layout button 404, when selected, applies method 200 to rearrange the graphical representations of data objects (and the relationships between the data objects the graphical representations of the data objects represent) on the canvas. In an example, selecting auto-layout on schema builder example 400 may result in a screenshot similar to FIG. 5. Options 405, when selected, displays various options for searching. Option 405 may include list of data objects (e.g., database tables) having searchable records. View options 406 may include a drop down menu, which, when selected displays the options available for viewing on the canvas. View options 406 may include toggle options, for enabling a user to switch between a view showing the element names of a database object (e.g., fields in a table) and a view showing labels for the same graphical representations of data objects. View options 406 may also include toggle options for switching between a view of the canvas that shows relationships between data objects, and a view of the canvas that does not show the relationships between data objects. View options 406 may also include toggle options for showing or hiding a legend on the canvas. The legend, when visible, provides information that explains what is indicated by the symbolic visual elements shown in the current view. Search input box 407 is an input box for search terms. Search button 408, when pressed, sends a request to server system 102 to perform a search related to the input entered into search input box 407. Username 410 displays the current logged in user. User menu 412 may be a pull down menu listing the options for the user, such as user profile, setup, system log, and logout options. Help 414, when selected, provides information to the user that is intended to be helpful in using schema builder 408, and help 414 may also provide additional helpful information related to the use of other features provided by server system 102. Schema builder 416 is the current application, which is used for building a schema using graphical representations of data objects within the schema and relationships between the data objects. App menu 418 may be a pull down menu, which, when selected, lists the various applications that are available to the user. Page help 420, when selected, opens a new window with help related to the current page. Feedback link 422, when selected, opens a new window where users can provide feedback regarding the schema builder and comment in an Ideas Exchange, which may be a page where users and developers can post ideas related to the schema builder. Object selection 424 displays the current selection of data object types. Selecting a type of data object, via object selection 424 may change the graphical representations of data objects visible to the user, which may change the layout computed by the auto layout feature. Select menu 425 may be a pull down menu with a selection of the type of data objects such as all data objects, selected data objects, standard data objects, custom data objects, and system data objects. Graphical representations of data objects from the selected data object type may appear on a side bar for selection for viewing on the canvas. Quick find 426 is an input box for finding data objects available for viewing on the canvas (e.g., data objects of the type selected via select menu 425). Entering characters contained in the names or labels of data objects may cause those data objects to be listed in side bar 432, which is discussed below. Clear selection 428, when selected, clears the selection of data objects for viewing on the canvas. Select all 430, when selected, selects all the data objects from the data object type and displays the selection on the canvas. Side bar 432 is a list of data objects of the selected data object type. A user may select data objects to be viewed on the canvas by checking a check box next to the data object. Side bar 434 is the left side bar with menu for selection to view in the canvas. Object title 436 displays the title of the data object on the canvas. View menu 438, when selected, displays more information about the data object to the user, and provides the user with options for editing the data object (e.g., replacing information for one or more of a data object's records). Canvas 440 is the part of the schema builder for displaying the relationships between the data objects in the database (e.g., the data objects may be displayed in a format that resembles an Entity Relationship Diagram (ERD)). The canvas displays the various graphical representations of data objects in a selected schema, which may include the data object fields, the data type and in a rectangle box. The canvas may also display a graphical representation of the relationships between the data objects. Using the toggle menu view options 406, the options may be set for the displaying the graphical representation of the schema. The canvas may optionally display the legend. Relationship line 442 is line displaying the relationship of the fields of data objects. View options 406 has a toggle input to show or hide relationships. Graphical representations of data objects on the canvas may be selected by clicking. In an embodiment, selecting of a graphical representation of a data object may cause the graphical representation of the data object and the relationship lines of the data object to be highlighted. Account object 443 is an example of what may be a graphical representation of a data object related to Accounts. Account object 443 is highlighted showing the current selection. Required fields 444 is shown as a red line next to fields which are required fields that must be included in the data objects when creating the data objects. Item object 445 is an example of a possible custom data object. Legend 446 is an embodiment of a legend on the canvas. Legend 446 shows coloring and symbols that are used to represent lookup relationships, master-detail relationships, and required fields of data objects in the graphical representation of the data object within the schema. User object 447 is another example of a graphical representation of a possible standard user data object. Zoom in button 448 when selected zooms in on the graphical representations of data objects on the canvas, showing less of the area that may be selected for viewing via the canvas, but the portion of the canvas that is currently selected for viewing remains visible and is enlarged, and more details may be visible in the enlarged view. Zoom out button 450 when selected zooms out the graphical representations of data objects in the canvas, which may show more graphical representations of data objects, reduced in size and possibly with less detail. Map 452 is a portion of the canvas showing current viewing scope of the canvas. Map 452 shows the entire view of the schema selected, but reduced in size. Map 452 may indicate the part of the map that is currently being shown on the canvas. Selecting a portion of map 452 may cause that portion of the schema to appear on the canvas. Account object 443 on map 454 is the location of the graphical representation of an account object in the representation of the schema in map 452. Account object on map 454 is highlighted showing that the graphical representation of the account object is currently being displayed on the canvas. User object on map 456 is the position of the graphical representation of a user object in the representation of the schema in map 452. Item object on map 458 is the position of the graphical representation of an item object in the representation of the schema in map 452. Master-detail relationship 460 shows the master-detail relationship, and may be indicated by a line of different color to differentiate the line representing the master-detail relationships from the line representing a look-up relationship.

Figure 5:
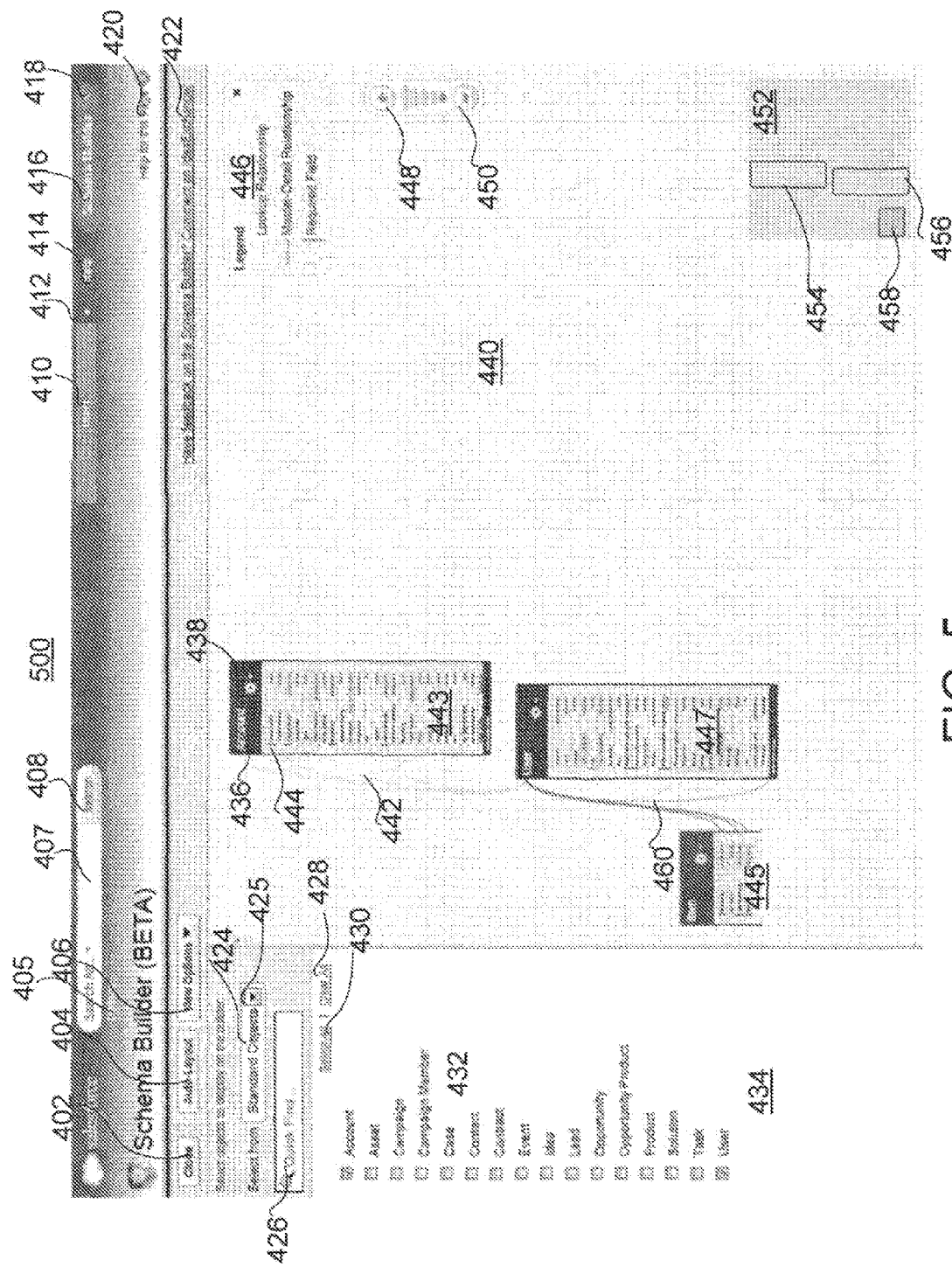
FIG. 5 shows a screenshot of an embodiment of an example schema in the schema builder after applying auto-layout.
Figure 6:
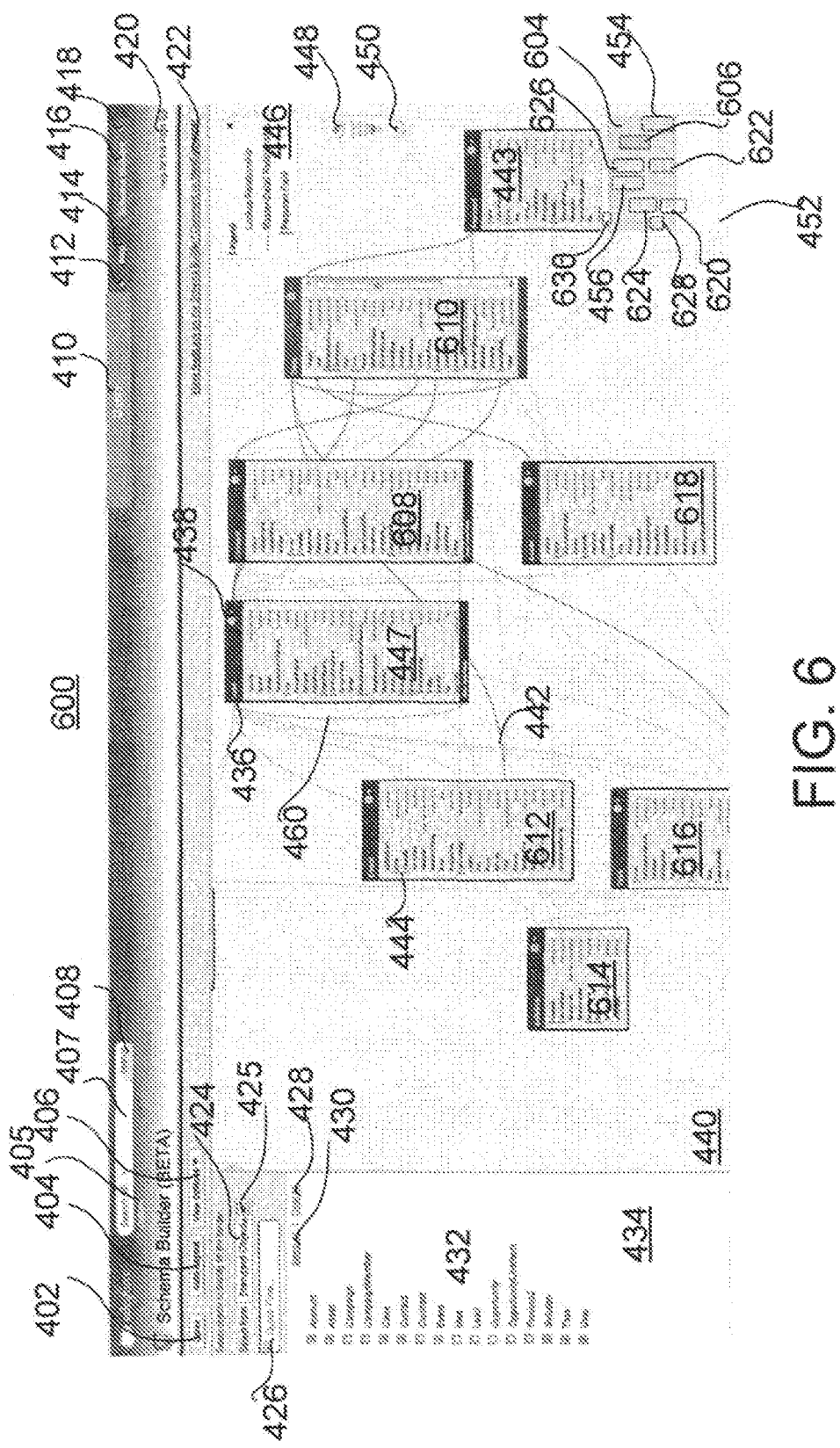
FIG. 6 shows a screenshot of an embodiment of another example schema in the schema builder prior to applying the auto-layout.
Figure 7:
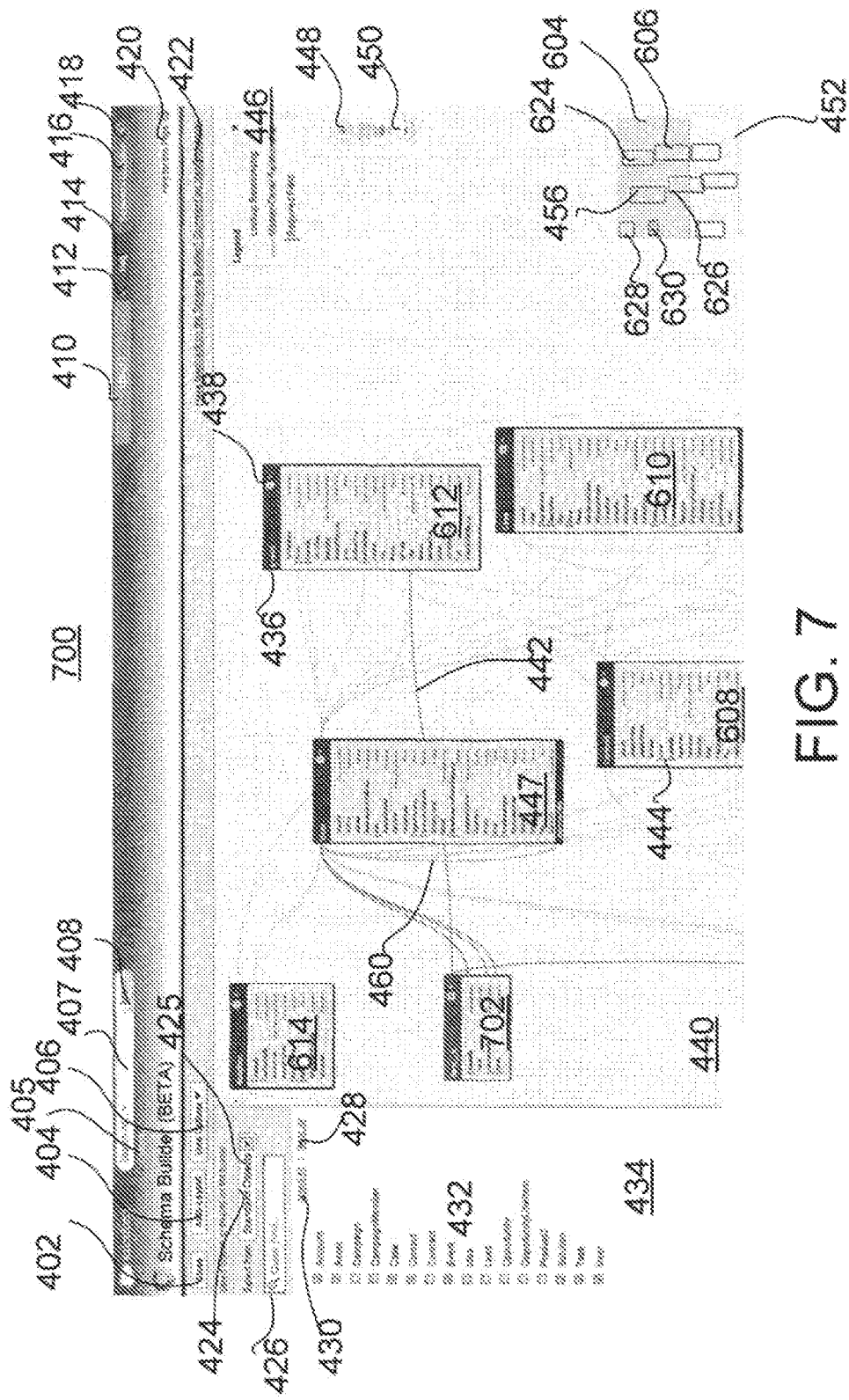
FIG. 7 shows a screenshot of an embodiment of another schema in the schema builder with auto-layout.

Although close button 402, auto-layout button 404, options 405, view options 406, search input box 407, search button 408, username 410, user menu ID 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, required fields 444, legend 446, zoom in button 448, zoom out button 450, map 452, appears in the screenshots of each of FIG. 4, FIG. 5, FIG. 6, and FIG. 7, since the description of close button 402, auto-layout button 404, options 405. view options 406, search input box 407, search button 408, username 410, user menu ID 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, required fields 444, legend 446, zoom in button 448, zoom out button 450, map 452, and master-detail relationship 460 were discussed above, that description will not be repeated in FIG. 5, FIG. 6, and FIG. 7.

Although user object 447, and user object on map 456 appear in the screenshots of each of FIG. 4, FIG. 5, FIG. 6, and FIG. 7, since the description of user object 447, and user objects on map 456 were discussed above, that description will not be repeated in FIG. 5, FIG. 6, and FIG. 7. Account object 443, account object on map 454, appear in the screenshots of each of FIG. 4, FIG. 5, and FIG. 6, since the description of account object 443, account object on map 454 were discussed above, that description will not be repeated in FIG. 5, and FIG. 6.

Although item object 445, and item object on map 458 appear in the screenshots of each of FIG. 4, FIG. 5, since the description of item object 445, and item object on map 458 were discussed above, that description will not be repeated in FIG. 5.

FIG. 5 shows a screenshot of an embodiment of schema builder with auto-layout example 500. Schema builder with auto-layout example 500 may include close button 402, auto-layout button 404, options 405. view options 406, search input box 407, search button 408, username 410, user menu ID 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, account object 443, required fields 444, item object 445, legend 446, user object 447, zoom in button 448, zoom out button 450, map 452, account object on map 454, user object on map 456, item object on map 458, and master-detail relationship 460. In other embodiments, scheme builder 400 may not have all of the elements listed and/or may have other elements instead of or in addition to those listed.

Schema builder with auto-layout example 500 shows a screen after an auto-layout of the objects displayed in the schema builder has been performed. Selection of the auto-layout button results in the schema builder applying method 200, and may result in a screenshot similar to FIG. 5. Object item 445 is related to object user, where as user object is related to the objects Account 443 and item 445. Applying auto-layout places object item 445 in a position closer to object user 447. Map 452 indicates the new position of the objects.

FIG. 6 shows a screenshot of an embodiment of schema builder example 600. Scheme builder example 600 shows with a schema with large number of relationships. Schema builder example 600 may include close button 402, auto-layout button 404, options 405. view options 406, search input box 407, search button 408, username 410, user menu ID 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, account object 443, required fields 444, item object 445, legend 446, user object 447, zoom in button 448, zoom out button 450, map 452, account object on map 454, user object on map 456, item object on map 458, master-detail relationship 460, display on canvas 604, object case on map 606, object contact 608, object case 610, object event 612, object solution 614, object task 616, object asset 618, object task on map 620, object asset on map 622, object event on map 622, object event on map 624, object case on map 626, object solution on map 628, and object item on map 630. In other embodiments, scheme builder example 600 may not have all of the elements listed and/or may have other elements instead of or in addition to those listed.

Display on canvas 604 is a highlighted portion on map 452 to indicate the portion of canvas 400 that is visible to the user. Object case 606 on map 452 is a visual representation of the position of object case 610 on canvas 440, shown highlighted on map 452, indicating the selection of the object for viewing on the canvas. Object contact 608 is the standard object type contact. Object case 610 is the standard object case. Object event 612 is the standard object event. Object solution 614 is the standard object solution. Object task 616 is the standard object task. Object asset 618 is the standard object asset. Object task on map 620 is the object task on the map. Object asset on map 622 in the object asset on the map. Object event on map 624 is the object event on the map. Object case on map 626 is the object case on the map. Object solution on map 628 appears on the bottom of map 604. Object item on map 630 appears on top of map 452, but not on canvas as indicated on the map.

Although display on canvas 604, object case on map 606, object contact 608, object case 610, object event 612, object solution 614, object event on map 624, and object case on map 626 appear in the screenshots of each of FIG. 6, FIG. 7, since the descriptions of display on canvas 604, object case on map 606, object contact 608, object case 610, object event 612, object solution 614, object event on map 624, and object case on map 626 were discussed above, that description will not be repeated in FIG. 7.

FIG. 7 shows a screenshot of an embodiment of schema builder after auto-layout 700. Schema builder after auto-layout 700 may include close button 402, auto-layout button 404, options 405, view options 406, search input box 407, search button 408, username 410, user menu ID 412, help 414, schema builder 416, App menu 418, page help 420, feedback link 422, object selection 424, select menu 425, quick find 426, clear selection 428, select all 430, objects 432, left side bar 434, object title 436, view menu 438, canvas 440, relationship line 442, required fields 444, item object 445, legend 446, user object 447, zoom in button 448, zoom out button 450, map 452, user object on map 456, master-detail relationship 460, display on canvas 604, object case on map 606, object contact 608, object case 610, object event 612, object solution 614, object event on map 624, object case on map 626, object solution on map 628, object item on map 630, and object item 702. In other embodiments, schema builder example 700 may not have all of the elements listed and/or may have other elements instead of or in addition to those listed.

Object item 702 is the object item appearing on the canvas due to rearrangement of graphical representations of data objects after an auto-layout. Prior to the auto-layout, object item 702 was visible on the canvas.

System Overview

Figure 8:
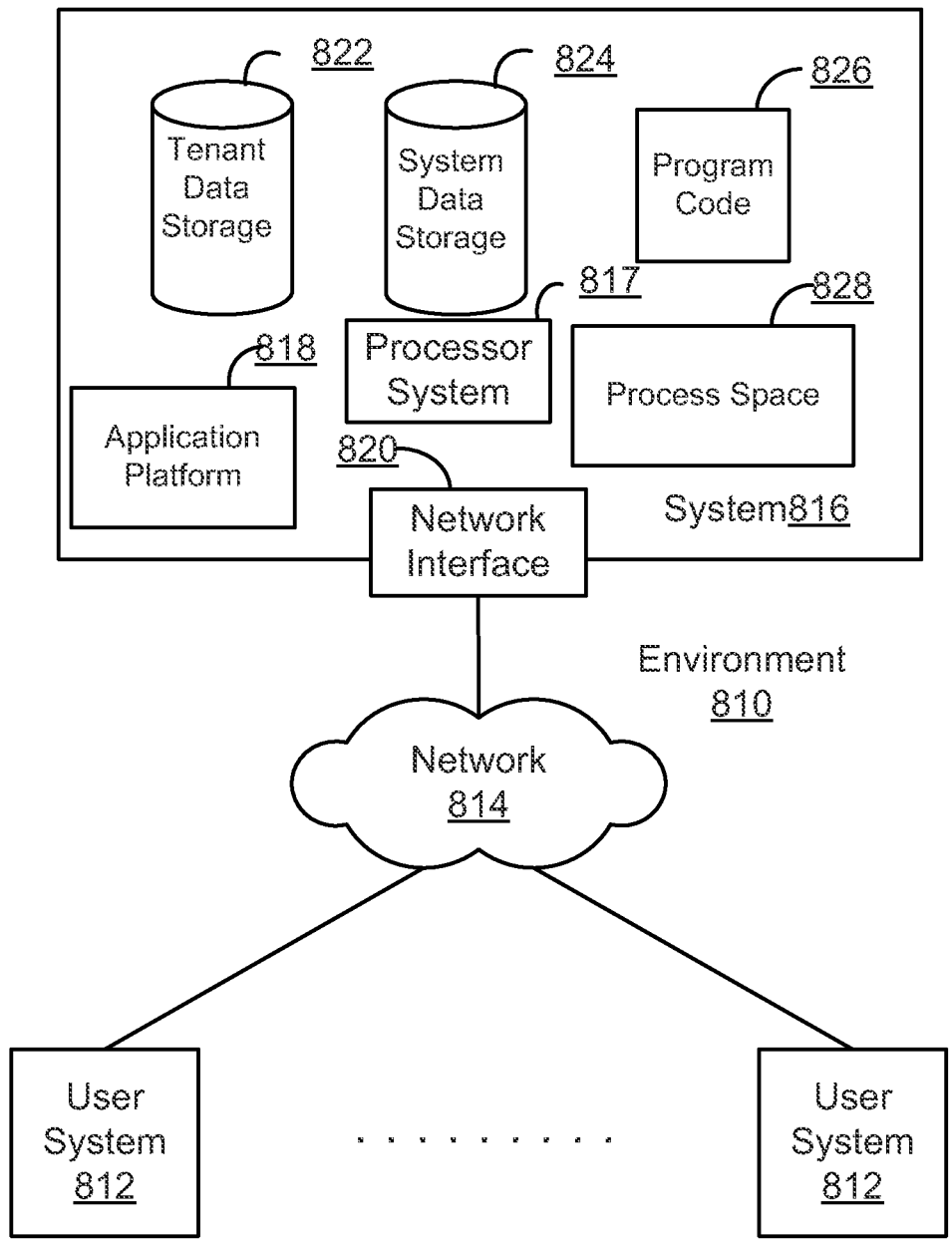
FIG. 8 shows a block diagram of an embodiment of an environment where in an on-demand database service might be used for methods and systems for web-based development tools.

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global Internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 923, system data storage 824 for system data 925 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database-indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global Internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
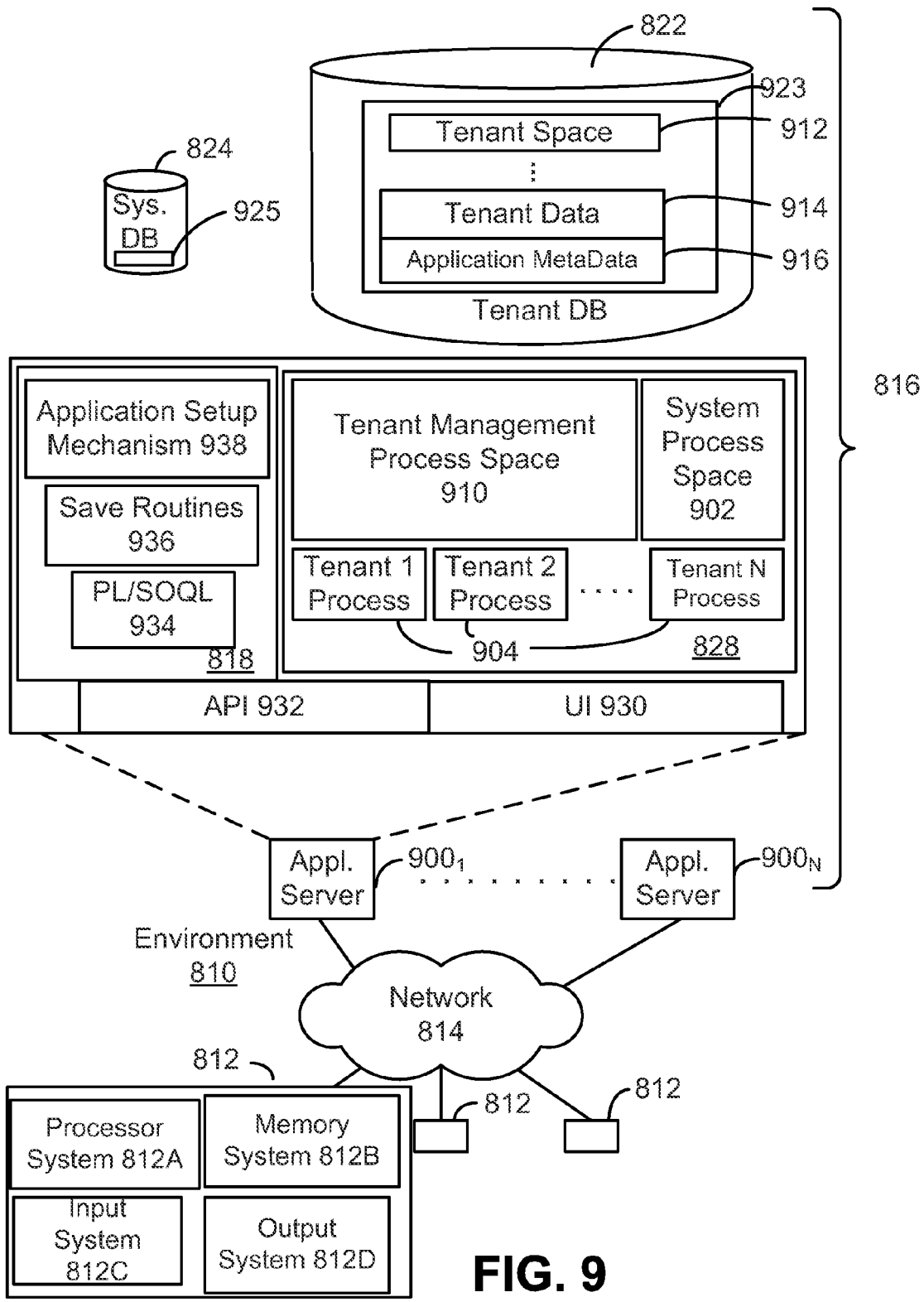
FIG. 9 shows a block diagram of an embodiment of elements of FIG. 8 and various possible interconnections between elements in an embodiment for methods and systems for web-based development tools.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 8 shows network 814 and system 816. FIG. 9 also shows that system 816 may include tenant data storage 822, tenant data 923, system data storage 824, system data 925, User Interface (UI) 930, Application Program Interface (API) 932, PL/SOQL 934, save routines 936, application setup mechanism 938, applications servers $900_1$-$2700_N$, system process space 802, tenant process spaces 804, tenant management process space 810, tenant storage area 812, user storage 814, and application metadata 816. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 8, system 816 may include a network interface 820 (of FIG. 8) implemented as a set of HTTP application servers 900, an application platform 818, tenant data storage 822, and system data storage 824. Also shown is system process space 802, including individual tenant process spaces 804 and a tenant management process space 810. Each application server 900 may be configured to tenant data storage 822 and the tenant data 923 therein, and system data storage 824 and the system data 925 therein to serve requests of user systems 812. The tenant data 923 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 804 managed by tenant management process 810 for example. Invocations to such applications may be coded using PL/SOQL 934 that provides a programming language style interface extension to API 932. A detailed description of some PL/SOQL language embodiments is discussed in commonly owned co-pending U.S. Provisional Patent Application No. 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 816 for the subscriber making the invocation and executing the metadata as an application in a virtual machine.

Each application server 900 may be communicably coupled to database systems, e.g., having access to system data 925 and tenant data 923, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 8 and 9)

Figure 10:
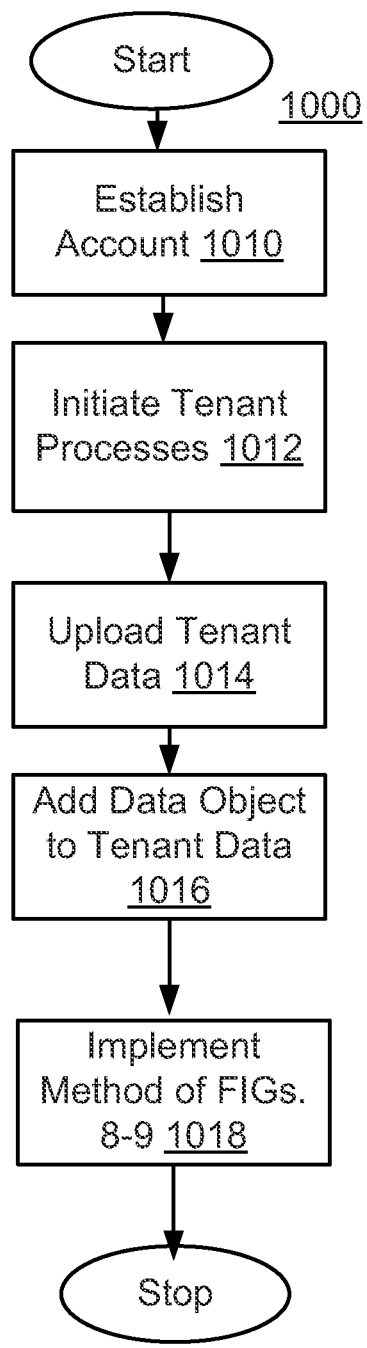
FIG. 10 illustrates an embodiment of an environment within which the system for web-based development tools may operate.

FIG. 10 shows a flowchart of an example of a method 1000 of using environment 810. In step 1010, user system 812 (FIGS. 8 and 9) establishes an account. In step 1012, one or more tenant process space 904 (FIG. 9) are initiated on behalf of user system 812, which may also involve setting aside space in tenant space 912 (FIG. 9) and tenant data 914 (FIG. 9) for user system 812. Step 1012 may also involve modifying application metadata to accommodate user system 812. In step 1014, user system 812 uploads data. In step 1016, one or more data objects are added to tenant data 914 where the data uploaded is stored. In step 1018, the methods associated with FIGS. 8-9 may be implemented. In another embodiment, although depicted as distinct steps in FIG. 10, steps 1002-1018 may not be distinct steps. In other embodiments, method 1000 may not have all of the above steps and/or may have other steps in addition to, or instead of, those listed above. The steps of method 1000 may be performed in another order. Subsets of the steps listed above as part of method 1000 may be used to form their own method.

Method for Creating the Environment (FIGS. 8 and 9)

Figure 11:
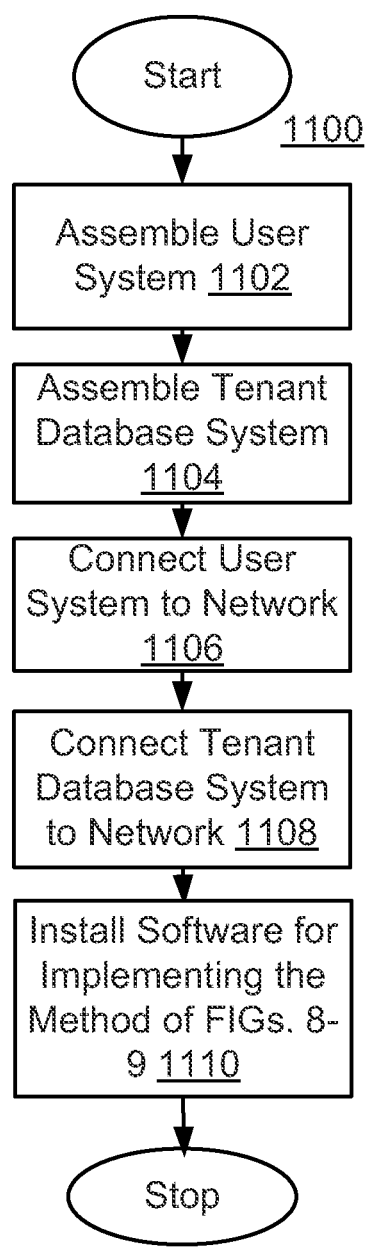
FIG. 11 illustrates embodiment of elements of FIG. 10 and various possible interconnections between elements of the environment.

FIG. 11 is a method of making environment 810, in step 1102, user system 812 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1104, system 816 (FIGS. 8 and 9) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 816 may include installing application platform 818, network interface 820, tenant data storage 822, system data storage 824, system data 925, program code 826, process space 828, UI 930, API 932, PL/SOQL 934, save routine 936, application setup mechanism 938, applications servers $100_1$-$100_N$, system process space 102, tenant process spaces 904, tenant management process space 110, tenant space 912, tenant data 914, and application metadata 116 (FIG. 9).

step 1106, user system 812 is communicatively coupled to network 904. In step 1108, system 816 is communicatively coupled to network 904 allowing user system 812 and system 816 to communicate with one another (FIG. 9). In step 1110, one or more instructions may be installed in system 816 (e.g., the instructions may be installed on one or more machine readable media, such as computer readable media, therein) and/or system 816 is otherwise configured for performing the steps of methods associated with FIGS. 8-9. In an embodiment, each of the steps of method 1100 is a distinct step. In another embodiment, although depicted as distinct steps in FIG. 11, steps 1102-1110 may not be distinct steps. In other embodiments, method 1100 may not have all of the above steps and/or may have other steps in addition to, or instead of, those listed above. The steps of method 1100 may be performed in another order. Subsets of the steps listed above as part of method 1100 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art.

Therefore, the scope of the appended claims should be accorded the broadest interpretation so as to encompass all such modifications and similar arrangements.

While one or more implementations have been described by way of example and in terms of the specific embodiments, it may be to be understood that one or more implementations are not limited to the disclosed embodiments. To the contrary, it may be intended to cover various modifications and similar arrangements as would be apparent to those skilled in the art. Therefore, the scope of the appended claims may be accorded the broadest interpretation so as to encompass all such modifications and similar arrangements.

EXTENSION AND ALTERNATIVES

In an alternative embodiment, instead of checking whether the sum of the absolute value of x-component and y-component of the velocity has crossed a threshold, each of the x-component and y-component could be check separately for whether a threshold value was crossed to determine whether to increment the position. Alternatively, the sum of the squares of the components of velocity could be compared to a threshold value, or the sum of the absolute values of another power or function of the components of the velocity could be compared to a threshold value. The form of the repulsive and/or attractive force between two graphical representations of data objects (1 and 2) may be the form of the gradient of a Yukawa potential, $$\text{Force} = K \frac{(x1-x2)\hat{i} + (y1-y2)\hat{j}}{((x1-x2)^2 + (y1-y2)^2)^{3/2}}, \text{ or,}$$

$$\text{Force} = -K[(x1-x2)\hat{i} + (y1-y2)\hat{j}].$$

Any of the prior mentioned forms of the force may be multiplied by a decaying exponential function of the distance between the two graphical representations of data objects. The decaying exponential may be used instead of or in addition to not computing the force between objects beyond a certain radius of one another. Instead of computing the velocity as being equal to or proportional to the force, the acceleration may be set equal to or proportional to the force, and distance may be taken as x=at²/2. Alternatively, the position of the objects may be computed by minimizing a potential energy of the system of objects, which may be the sum of the potential energies between each pair of objects $$\left( \text{e.g., Potential Energy(object1, object2)} = \frac{K}{((x1-x2)^2 + (y1-y2)^2)^{1/2}}, \right.$$

$$\text{Potential Energy(object1, object2)} = K((x1-x2)^2 + (y1-y2)^2) \text{ or}$$

$$\left. \text{Potential Energy(object1, object2)} = \frac{K e^{-a((x1-x2)^2+(y1-y2)^2)^{1/2}}}{((x1-x2)^2 + (y1-y2)^2)^{1/2}} \right).$$

Instead of a damping constant that is multiplied by the attractive force, there may be a damping term that is proportional to the velocity, for example. In an embodiment, there may be a collision detector, that detects when two graphical objects collide, and prevents the two graphical objects from overlapping one another on the canvas.

Although the invention has been described with reference to specific embodiments, it should be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method for placing data objects of a database schema using an online tool, the method comprising:
   receiving input at a system, about a schema, the system including at least a processor system having at least a processor, and a memory system having one or more computer readable media;
   determining, by the processor system, relationships between objects of the schema;
   determining, by the system, positions on a graphical canvas of graphical representations of the objects based on the relationships between the objects by at least performing an iterative computation having one or more iterations,
      for each iteration, computing a net force on each graphical representation of one of the objects, for each object, after a net force is computed for that graphical representation, checking if a sum of an absolute value of a first component of the net force and an absolute value of a second component of the net force that is orthogonal to first component is less than a threshold value;
      if the sum is less than the threshold, not updating the position; and
      if the sum is greater than the threshold, updating the position;
   wherein the computation reduces the net forces on the graphical representation of the objects; and
   automatically displaying the positions of each graphical representation of one the objects on a graphical canvas.

2. The method of claim 1, the determining of the positions of the graphical representation of the objects being performed by at least calculating any attractive forces and any repulsive forces between the graphical representation of the objects and adjusting the positions to reduce the net forces on the graphical representation of the objects.

3. The method of claim 2, each of the repulsive forces between a pair of the objects is inversely proportional to the square of the distance between graphical representations of the pair of objects.

4. The method of claim of 2, further comprising: for each object repeating the computing of the net force, the sum, and the checking until the sum is less than the threshold value for all graphical representations of objects in a view of the schema.

5. A non-transitory computer readable media storing one or more machine instructions, which when invoked carry out a method comprising:
   receiving input at a system, about a schema, the system including at least a processor system having at least a processor, and a memory system having one or more computer readable media; determining, by the processor system, relationships between objects of the schema;
   determining, by the system, positions on a graphical canvas of graphical representations of the objects based on the relationships between the objects by at least performing an iterative computation having one or more iterations,
      for each iteration, computing a net force on each graphical representation of one of the objects, for each object, after a net force is computed for that graphical representation, checking if a sum of an absolute value of a first component of the net force and an absolute value of a second component of the net force that is orthogonal to first component is less than a threshold value;

if the sum is less than the threshold, not updating the position; and if the sum is greater than the threshold, updating the position;

wherein the computation reduces the net forces on the graphical representation of the objects; and automatically displaying the positions of each graphical representation of one the objects on a graphical canvas.

6. The method of claim 1, the receiving of the input at the system further comprises: receiving an input from a user system, the system hosts a multi-tenant database.

7. The method of claim 1, the receiving of the input at the system further comprises: receiving an input being due to a change in the schema.

8. The method of claim 1, the receiving of the input at the system further comprises: receiving an indication of a change in viewing options.

9. The method of claim 1, further comprises selecting objects for displaying the graphical representations of the objects on the graphical canvas.

10. The method of claim 1, further comprises selecting viewing options for displaying the graphical representations of the objects on the graphical canvas.

11. The method of claim 1, further comprises sending from the system having the database system to a user system a portion of the graphical canvas and a map of the graphical canvas, the map having a navigable representation of the schema and a selected region representing a current viewing scope of the graphical canvas, which is a representation of the portion of the graphical canvas.

12. The method of claim 1, further comprises receiving a selection of an object on the graphical canvas, and in response automatically highlighting the graphical representation of the object and the connections of the object on the graphical canvas.

13. The method of claim 1, the displaying of the positions of objects on a graphical canvas of graphical representations of the objects in a first view including at least changing the selection of objects for display and automatically rearranging the selection of objects in a second view such that at least one object of the second view appears in the first view.

14. A system comprising:
a processor system including at least one processor;
an interface for connection with a network; and
a memory system storing a schema and an algorithm for determining position of objects in the schema and placing the objects on a canvas, the algorithm implementing a method including at least receiving input at a system, about a schema, the system including at least a processor system having at least a processor, and a memory system having one or more computer readable media; determining, by the processor system, relationships between objects of the schema;

determining, by the system, positions on a graphical canvas of graphical representations of the objects based on the relationships between the objects by at least performing an iterative computation having one or more iterations, for each iteration, computing a net force on each graphical representation of one of the objects, for each object, after a net force is computed for that graphical representation, checking if a sum of an absolute value of a first component of the net force and an absolute value of a second component of the net force that is orthogonal to first component is less than a threshold value;

if the sum is less than the threshold, not updating the position; and if the sum is greater than the threshold, updating the position;

wherein the computation reduces the net forces on the graphical representation of the objects; and automatically displaying the positions of each graphical representation of one the objects on a graphical canvas.

15. The method of claim 1, the force having two components, including at least the first component being proportional to $$(x_1-x_2)/[(x_1-x_2)^2+(y_1-y_2)^2],$$

and the second component being proportional to $$(y_1-y_2)/[(x_1-x_2)^2+(y_1-y_2)^2].$$

16. The method of claim 1, the force on a given graphical representation of a given object being computed by adding only forces from other objects that are within a predetermined radius of the given object.

17. The method of claim 1, the force between two objects, which are separated by a distance, being inversely proportional to the distance.

\* \* \* \* \*